United States Patent
Barna

(10) Patent No.: US 7,423,676 B2
(45) Date of Patent: Sep. 9, 2008

(54) ASYMMETRIC COMPARATOR FOR USE IN PIXEL OVERSATURATION DETECTION

(75) Inventor: Sandor L. Barna, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 49 days.

(21) Appl. No.: 11/339,632

(22) Filed: Jan. 26, 2006

(65) Prior Publication Data
US 2006/0119717 A1   Jun. 8, 2006

Related U.S. Application Data

(62) Division of application No. 10/225,170, filed on Aug. 22, 2002.

(51) Int. Cl.
 *H04N 5/217* (2006.01)
 *H04N 3/14* (2006.01)
 *H04N 5/335* (2006.01)

(52) U.S. Cl. ...................... 348/241; 348/300

(58) Field of Classification Search ............... 348/222.1, 348/241, 243, 250, 251, 257, 300, 319
See application file for complete search history.

(56) References Cited

U.S. PATENT DOCUMENTS

| | | | |
|---|---|---|---|
| 5,025,177 A | 6/1991 | Mounger | |
| 5,955,899 A * | 9/1999 | Afghahi | 327/65 |
| 6,020,768 A | 2/2000 | Lim | |
| 2003/0132786 A1 | 7/2003 | Brehmer et al. | |
| 2003/0133627 A1 | 7/2003 | Styduhar | |

* cited by examiner

*Primary Examiner*—John M Villecco
*Assistant Examiner*—Daniel M Pasiewicz
(74) *Attorney, Agent, or Firm*—Dickstein Shapiro LLP

(57) ABSTRACT

An imaging circuit using an asymmetric comparator to detect an oversaturated pixel is disclosed. The comparator employs a transistor differential pair which are fabricated to be slightly unbalanced. By varying the channel widths of the two transistors during fabrication, the voltage required to trigger the comparator can be raised or lowered as desired to set an oversaturation level which triggers the comparator.

11 Claims, 4 Drawing Sheets

ASYMMETRIC COMPARATOR FOR USE IN PIXEL OVERSATURATION DETECTION

This is a divisional application of U.S. patent application Ser. No. 10/225,170, filed on Aug. 22, 2002, the entire disclosure of which is incorporated by reference herein.

FIELD OF THE INVENTION

The present invention relates to a comparator which is used to flag pixel oversaturation in an image sensor.

BACKGROUND OF THE INVENTION

Recent technology advances have led to a significant interest in CMOS active pixel sensors (APS) as replacements for other image sensors. Such sensors typically have a photodiode for generating a pixel image signal. The photodiode is typically reset to a known voltage before image change integration by the photodiode. Both the photodiode reset signal and the photodiode image signal are sampled and read out and subtracted (reset signal—image signal) to produce the actual pixel integrated charge signal.

One observed artifact with such sensors is the presence of dark images which occurs when pixels oversaturate due to very bright images. When the pixel image signal saturates, the signal level becomes very close to ground. As the photocurrent produced by the photodiode continues to increase at pixel image signal saturation, the photodiode voltage will start to reduce during the time of the pixel reset and reset signal level sampling. This will cause the sampled reset signal level to be reduced. With increasing photocurrent, the reset signal level will continue to drop. Since the image signal level is saturated near ground and the reset signal level is dropping, the apparent integrated signal (reset signal level—image signal level) will actually decrease and the resulting digital image will have a dark spot in the oversaturated region. This can create a very disturbing effect in the final image, especially when an object like the sun is captured, giving an eclipse-like image. There is no clear method for identifying this condition after an image signal has been digitized.

One proposal to correct for this effect is to flag saturated pixels in the pixel sampling circuitry with a comparator so that remedial action can be taken by downstream circuits. Thus, a comparator compares each pixel's image signal level prior to pixel reset. All pixels with an image signal level below a certain voltage are flagged as saturated and a digital "saturated" value may be substituted in place of the pixel output (reset signal—image signal) digitized value by on-chip timing and control logic. Since sampling typically occurs on a column-wise basis, each column circuit needs its own comparator. This comparator will also need a voltage reference, corresponding to a threshold level just enough above ground to reliably flag saturated pixels without significantly reducing the maximum signal swing out of the pixels. This is often a value of less than 100 mV. Unfortunately, reliable generation of this threshold voltage and providing a voltage generating circuit to produce this voltage takes power and additional chip area. Accordingly, a simpler technique which consumes less power is desired.

BRIEF SUMMARY OF THE INVENTION

The present invention provides a circuit for indicating when a pixel oversaturation condition occurs or is about to occur so that downstream processing circuits may suitably take remedial action to handle the oversaturation condition.

In one aspect, a flag signal is generated by a differential comparator when a pixel image signal is about to oversaturate. The comparator is unbalanced to provide a switching threshold slightly above ground and receives the pixel image signal on one input and ground at the other input. The comparator indicates a new condition when the pixel image signal falls below the threshold and reaches saturation near a ground voltage.

The comparator comprises a differential transistor pair, wherein the gate of one transistor is connected to receive the pixel image signal while the gate of the other transistor is connected to ground. The differential transistor pair are fabricated to have differing conduction characteristics to provide the unbalanced operation.

These and other features and advantages of the invention will be more clearly seen from the following detailed description of the invention which is provided in connection with the accompanying drawings.

DETAILED DESCRIPTION OF THE INVENTION

Figure 1A:
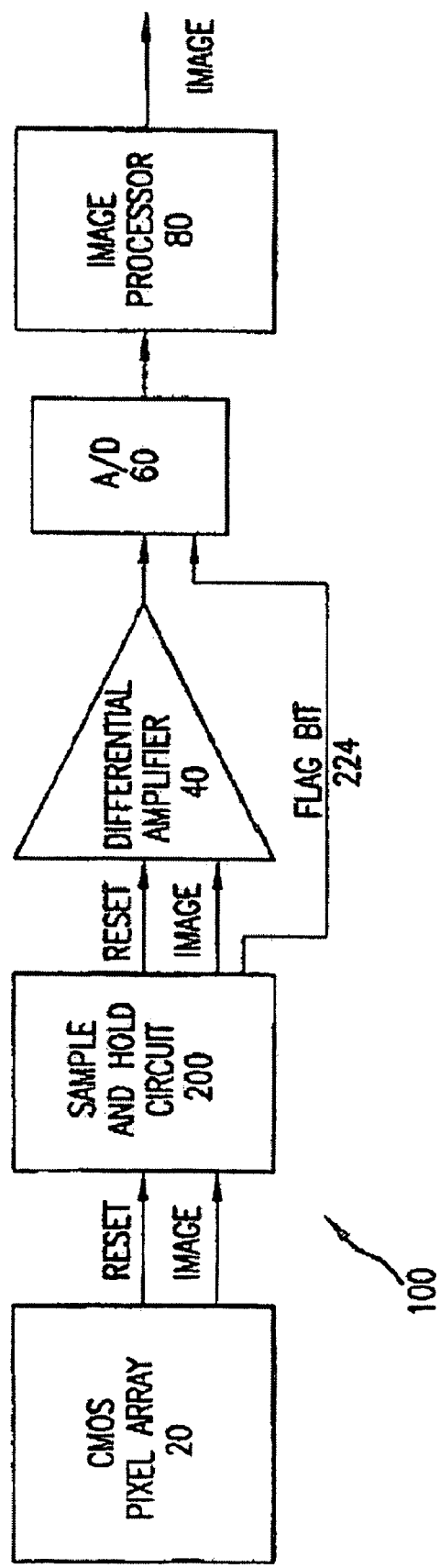
FIGS. 1A and 1B each show a block diagram of one embodiment of the CMOS imaging device of the present invention.

As shown in FIG. 1A the CMOS pixel imaging device 100 of the present invention comprises a CMOS pixel array 20 having a plurality of pixels arranged in rows and columns. A sample and hold circuit 200 receives a reset signal and a pixel image signal from all the pixels in an array. Typically all the pixels in a given row are selected and the pixel outputs of the selected row are placed on respective column lines which are in turn sequentially coupled to the sample and hold circuit 200. A sample and hold circuit can be provided for each column line of the array.

Figure 1B:
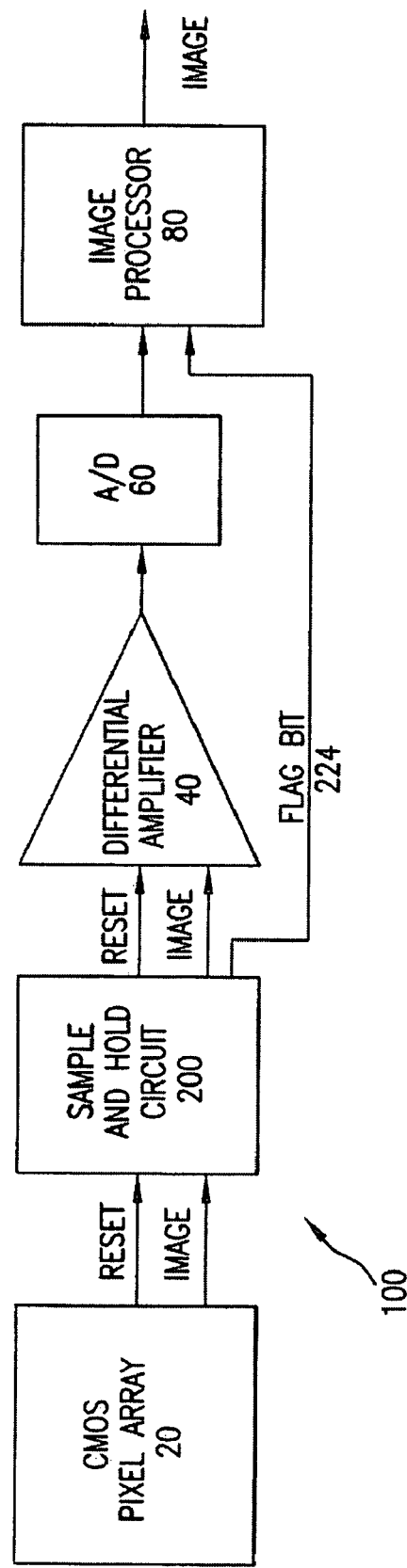

The sample and hold circuit samples the reset signal and pixel image signal from each pixel and provides the sampled signal to a differential amplifier 40, where they are subtracted to produce a pixel output signal. The output signal is amplified, then digitized by an analog to digital converter 60, and then processed in an image processor 80. As shown in FIG. 1A, the sample and hold circuit 200 also produces a flap signal 224 to the digital converter 60 indicating an oversaturated pixel image signal. In another embodiment as shown in FIG. 1B, the sample and hold circuit 200 also produces a flag signal 224 to image processor 80 indicating an oversaturated pixel image signal.

Figure 2:
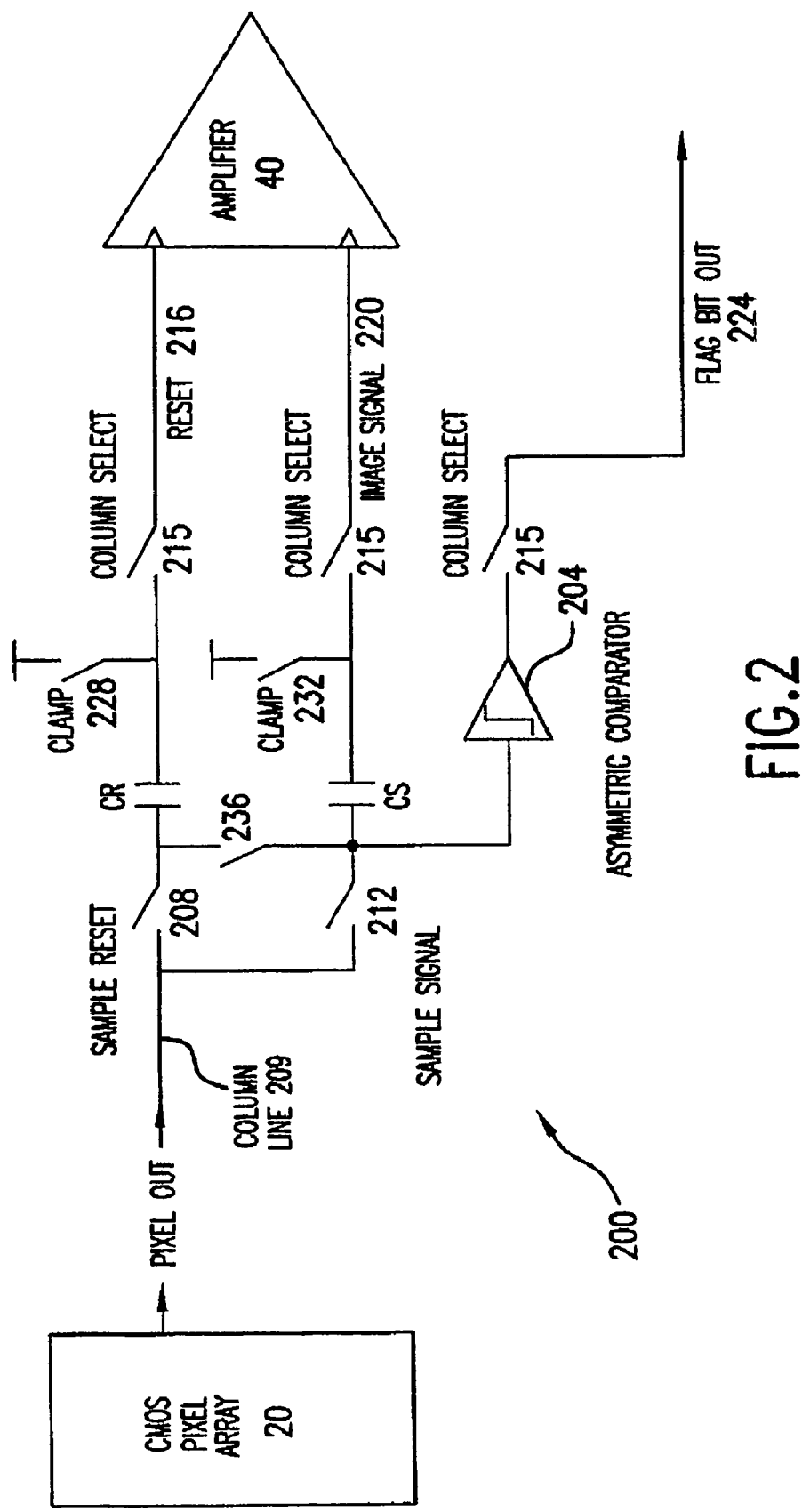
FIG. 2 is schematic diagram of the sample and hold circuit of FIG. 1.

FIG. 2 shows the sample and hold circuit 200 in greater detail. The reset signal is sampled onto capacitor $C_R$ while the image signal is sampled onto capacitor $C_S$. The reset signal sampling is controlled by switch 208 while the pixel image sampling is controlled by switch 212. When the column select switches 215 are closed and crowbar switch 236 is also closed, the reset signal and pixel image signal are sent to a differential amplifier 40 which subtracts the two signals. This is the normal sample and hold operation for the pixel. Thus, when the reset signal is sampled and stored on the capacitor $C_R$, the reset switch 208 is closed. When the image signal is to be sampled and stored on the capacitor $C_S$, the signal switch 212 is closed. The switches 208 and 212 are not typically closed at the same time. The clamp switches 228 and 232 are used to pre-charge one side of the capacitor $C_R$, $C_S$ before sampling.

FIG. 2 also shows an asymmetric comparator 204 having a predetermined threshold and which generates the flag signal 224 whenever the pixel image signal reaches that threshold. Assuming the above sampling occurs on a column-wise basis, each column line 209 has its own sample and hold circuit 200 and associated comparator 204. When a column line 209 with a particular pixel is selected thereby closing all 3 column select switches 215, the clamps 228 and 232 are opened, the crowbar switch is closed, and the signals stored on the capacitors $C_R$ and $C_S$ are forced out the reset and signal lines 216 and 220, respectively and into differential amplifier 40. Normally, the reset voltage and signal voltage are subtracted by the amplifier 40 and the result, representing the pixel image signal, is sent to the digitizer 60. However, whenever the pixel image signal falls to the threshold level of the asymmetric comparator 204, the pixel image signal is flagged as saturated and the flag bit 224 is enabled. When the flag bit 224 is enabled, the image processor 80 substitutes a predetermined pixel digital value for the normal (reset signal-image signal) digitized value normally formed by amplifier 40.

The asymmetric comparator 204 switches at a threshold voltage sufficiently above ground to reliably flag saturated pixels before the pixel image signal level reaches ground. Typically this reference voltage is less than or equal to 100 mV above ground level, although the present invention should not be limited only to this range.

Figure 3:
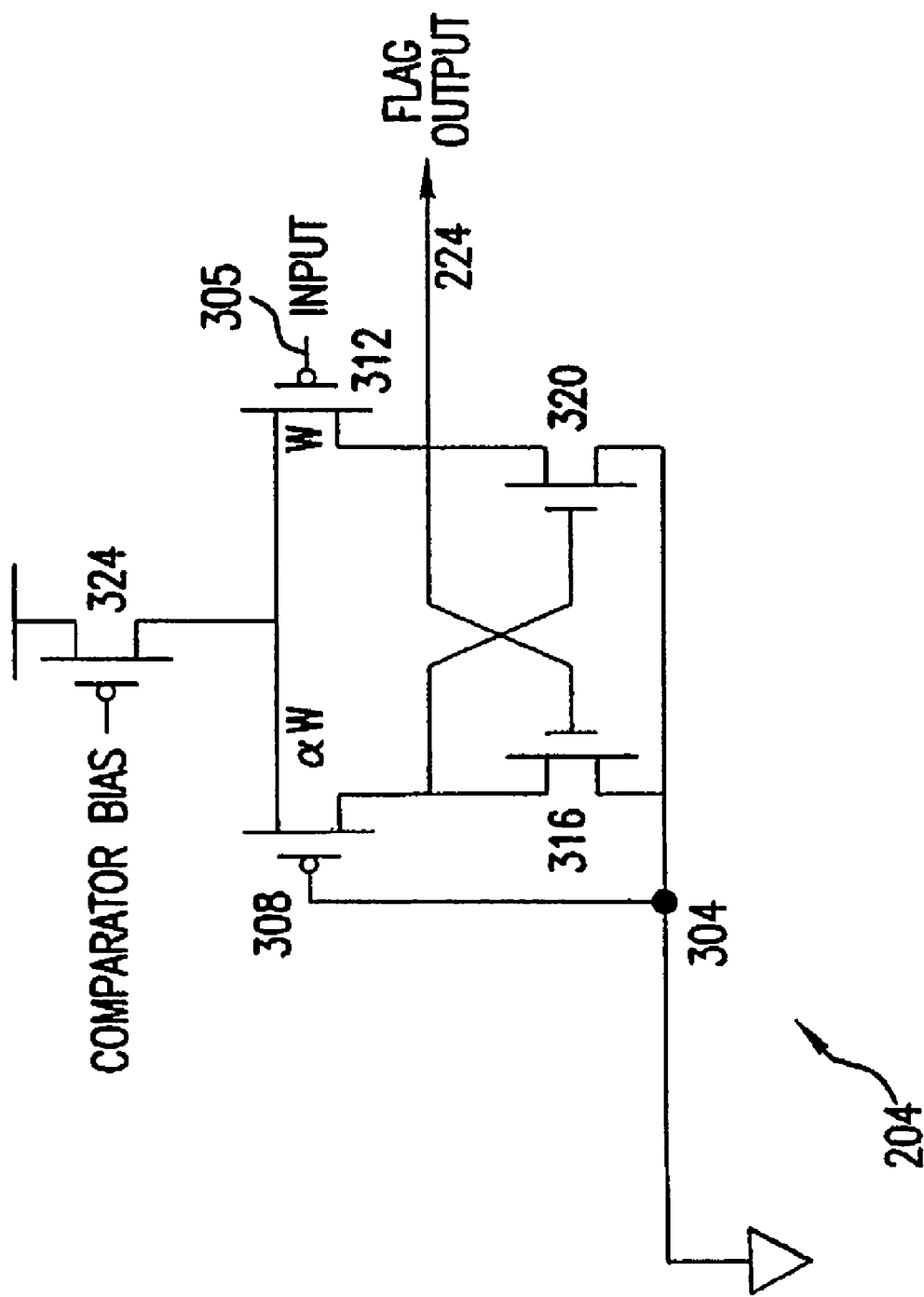
FIG. 3 is a schematic diagram of the asymmetric comparator of FIG. 2.

FIG. 3 illustrates asymmetric comparator 204 in greater detail. The comparator 204 is asymmetric in that there is a small voltage shift or offset in the level at which the comparator output switches from a '1' to a '0' or vice versa. As shown in FIG. 3, one reference input 304 of the asymmetric comparator 204 is connected to ground, with the pixel image signal is connected to the other input 305. Because the comparator is asymmetric, it will switch states whenever the pixel image signal at input 305 falls below or rises above the asymmetric offset which is typically set to less than or equal to 100 mV although other voltage levels can be used.

The comparator comprises a differential PMOS pair of transistors 308 and 312, a pair of cross-coupled NMOS current source transistors 316 and 320, and a biasing transistor 324. The gate of the PMOS transistor 308 is tied to the reference input, i.e., ground, while the gate of the PMOS transistor 312 receives the pixel image signal at input 305. Scaling the PMOS transistor 308 to, for example, a percentage of the channel width of the input PMOS transistor 312, causes the comparator 204 to become slightly unbalanced, i.e., asymmetric, with one transistor having a greater drive strength than the other. In FIG. 3, this scaling is symbolized by the αW next to the transistor 308 and the W next to the transistor 312. In the case where α is equal to 0.9, the transistor 308 would have a width measuring 90% of the transistor 312. At that time, the input gate 312 would be at a slightly higher voltage than the grounded PMOS gate 308, so as to balance the currents flowing therethrough. The biasing transistor 324 controls the total amount of current flowing through the comparator 204. The amount of this bias current, in combination with the relative widths of the channels of transistors 308 and 312, determines the switching point of the comparator 204 which in the exemplary embodiment described is set to be less than or equal to 100 mV.

If the voltage at the input 305 is greater than the offset reference voltage, e.g., 100 mV, the comparator will output a "0," whereas if the input voltage is less than the offset reference voltage, the comparator will output a "1." By adjusting the relative widths (during fabrication) and the bias currents (during operation) of the two PMOS transistors 308 and 312, the voltage required to switch the comparator from a 1 to a 0 or vice versa can be raised or lowered as desired. Accordingly, the threshold of the saturation level which causes the flag output 224 to indicate a saturation condition can be controlled by unbalanced design of the circuit and there is no need for an additional voltage generating driver circuit to generate a signal to produce the switching threshold characteristic of the comparator 204.

While the invention has been described and illustrated with reference to a specific exemplary embodiment, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A method of operating a CMOS imager circuit, the method comprising:
   receiving a pixel image signal at an input of a comparator; and
   providing a first switching threshold for said comparator with a gate of a first transistor of a differential transistor pair of a first conductivity type, wherein the first switching threshold is less than or equal to about 100 mV above ground level, and
   wherein said gate of said first transistor is connected at an input of said comparator to receive said pixel image signal and a gate of a second transistor of said differential transistor pair is connected to receive a voltage potential.

2. The method of claim 1, further comprising generating a flag signal to a pixel processing circuit when a received pixel image signal falls below said first switching threshold with an output terminal.

3. The method of claim 1, wherein changing a logical state when said pixel image signal falls below said first switching threshold with an output signal.

4. The method of claim 1, wherein the step of providing a first switching threshold comprises causing the first and second transistors of said differential transistor pair to have different drive strength.

5. The method of claim 1 further comprising the step of varying the first switching threshold.

6. The method of claim 1, wherein said comparator comprises an asymmetric comparator.

7. The method of claim 1 further comprising varying the first switching threshold.

8. The method of claim 7, wherein the step of varying the first switching threshold comprises adjusting a bias circuit connected to said differential transistor pair.

9. The method of claim 1 further comprising generating a flag signal to a digital converter when a received pixel image signal falls below said first switching threshold with an output terminal.

10. A method of operating a CMOS imager circuit, the method comprising:
    receiving a pixel image signal at an input of a comparator;
    providing a first switching threshold for said comparator with a gate of a first transistor of a differential transistor pair of a first conductivity type, wherein said gate of said first transistor is connected at an input of said comparator to receive said pixel image signal and a gate of a second transistor of said differential transistor pair is connected to receive a voltage potential;

biasing said comparator connected to said differential transistor pair with a bias circuit; and varying the first switching threshold by adjusting the bias circuit.

11. A method of operating a CMOS imager circuit, the method comprising:

receiving a pixel image signal at an input of a comparator; and providing a first switching threshold for said comparator with a gate of a first transistor of a differential transistor pair of a first conductivity type, wherein providing the first switching threshold comprises scaling one of the first and second transistors of said differential transistor pair so that the first and second transistors have different channel widths, the second transistor being scaled to a width measuring about 90% of a width of the first transistor, and wherein said gate of said first transistor is connected at an input of said comparator to receive said pixel image signal and a gate of a second transistor of said differential transistor pair is connected to receive a voltage potential.

* * * * *